W. J. HAMILTON.
FLY TRAP.
APPLICATION FILED OCT. 18, 1911.
1,027,602.
Patented May 28, 1912.
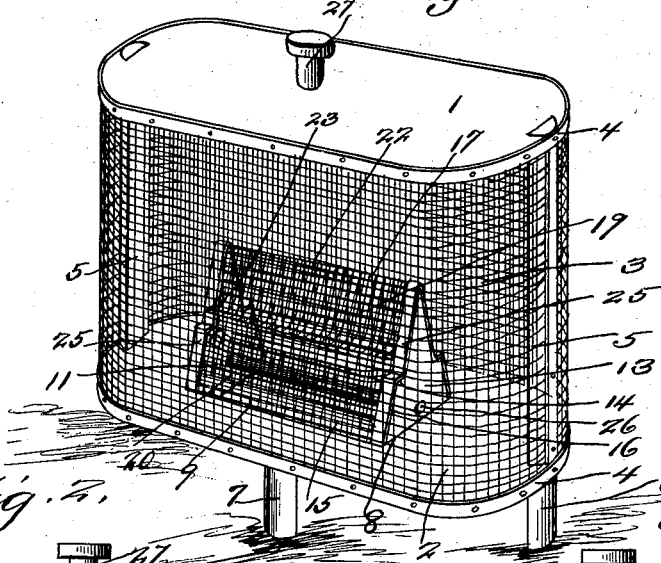
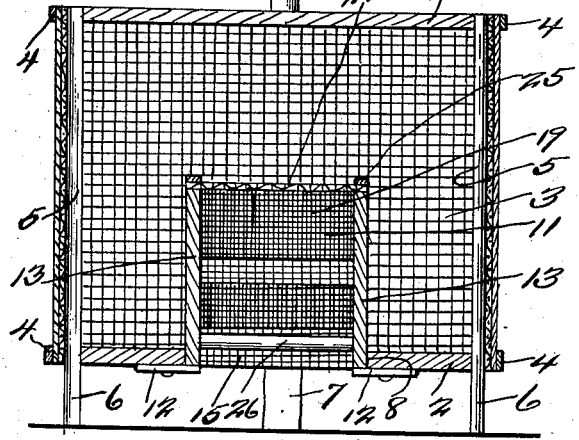
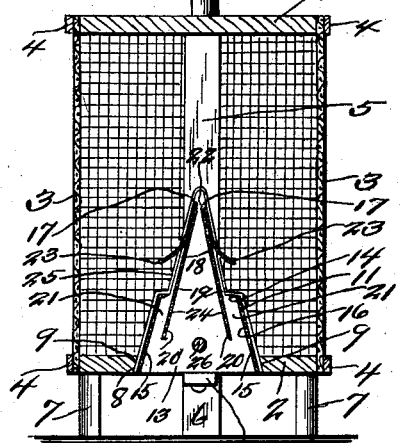
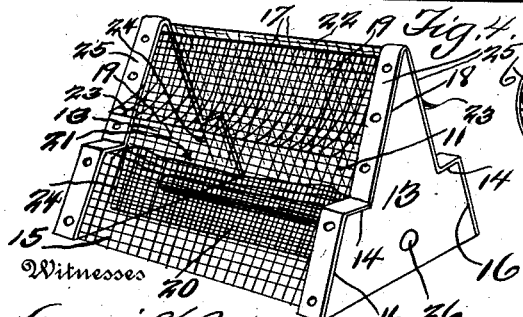
Witnesses
Francis T. Boswell,
C. E. Frothingham,
Inventor
W. J. Hamilton,
By D. Swift
Attorney

UNITED STATES PATENT OFFICE.

WILLIAM J. HAMILTON, OF ALLIANCE, NEBRASKA.

FLY-TRAP.

1,027,602.  Specification of Letters Patent.  Patented May 28, 1912.

Application filed October 18, 1911. Serial No. 655,362.

*To all whom it may concern:*

Be it known that I, WILLIAM J. HAMILTON, a citizen of the United States, residing at Alliance, in the county of Boxbutte and State of Nebraska, have invented a new and useful Fly-Trap; and I do hereby declare the following to be a full, clear, and exact description of the invention, such as will enable others skilled in the art to which it appertains to make and use the same.

This invention relates to a new and useful fly trap.

The principal object of the invention is the provision of an improved device of this nature in which novel features are involved.

One of the features of the invention is the provision of an outer mesh work casing having a smaller removable V-shaped mesh work casing arranged therein and secured to the bottom of the outer mesh work casing. The V-shaped casing is open at its bottom to permit the flies or other insects to pass through the inlets.

Another feature of the device is the opening in the bottom of the outer casing, which opening is provided with beveled edges to prevent the V-shaped casing from entering the outer casing too far, there being latches to hold the V-shaped casing in the opening.

Another feature of the invention is the novel construction of the mesh work of the V-shaped casing, which will permit the entrance of the flies or other insects, but not their exit.

The invention comprises further features and combination of parts, as hereinafter set forth, shown in the drawings and claimed.

In the drawings:—Figure 1 is a view in perspective of the fly trap constructed in accordance with the invention. Fig. 2 is a longitudinal sectional view. Fig. 3 is a transverse sectional view. Fig. 4 is a detail perspective view of the inner or V-shaped casing. Fig. 5 is a bottom plan view of the entire fly trap.

Referring to the drawings 1 and 2 designate the top and bottom of the fly trap. Top and bottom are joined by sheet of wire mesh work 3, thus forming a casing. Sheet metal bands 4 are secured to the top and bottom over the mesh work, as shown. Standards 5 are dovetailed in the top and bottom, one at each end, to hold the same spaced apart. These standards are extended a short distance below the bottom in order to afford legs 6, which together with the legs 7, support the fly trap a short distance above any suitable base. The bottom 2 is provided with an opening 8, as shown in Fig. 5. The longitudinal sides 9 are beveled, as shown in the transverse sectional view of Fig. 3. The object in beveling these sides, is to afford means to prevent the smaller V-shaped casing 11 from entering the outer casing too far, while the latches 12 prevent the casing from falling downwardly out of the opening 8.

The inner casing 11 consists of the two end pieces 13, which are stepped as shown at 14. Areas of mesh work 15 are secured to the edges 16 below the step portions 14 of the end pieces 13. The upper edges of the mesh work 15 at each end thereof are bent over the steps 14, as shown in Fig. 4. Sheets of mesh work bent upon themselves as at 17 are secured to the edges 18 of the end pieces 13. These sheets of mesh work are designated by the character 19. The lower portions 20 which are adjacent one another of the sheets of mesh work 19 are extended a short distance below the upper edges of the areas of mesh work 15, thus forming two of the entrance passages 21. The sheets of mesh work 19 at the points where they are folded on themselves are spaced apart so as to provide the third entrance opening for passage 22. The portions 23 of the sheets of mesh work 19 are extended in close positions to the upper edges of the areas of mesh work 15, and are flared outwardly, as shown. The ends of the portions 20 of the sheets of mesh work 19 are seated in the grooves 24 of the end pieces 13. To afford a finish to the inner casing, and to secure the areas of mesh work to the end pieces 13, strips of sheet metal 25 are secured to the edges of the end pieces.

To remove the inner casing from the opening 8, in order to empty the outer casing of the flies or other insects a rod 26 connects between the end pieces 13. This rod 26 not only affords a hand hold to remove the inner casing but also constitutes means for holding the end pieces firmly spaced apart.

Natural tendency of flies or similar insects when traveling over an approximately vertical surface is to always move upwardly, therefore when the flies enter the inner V-shaped casing they will either pass through the passages 21 or the opening at the apex of the V-shaped casing, and after once having entered the outer casing they find it difficult to escape, for they hardly ever move downwardly upon a substantially vertical surface.

The top of the fly trap is provided with a handle 27, so as to permit the trap to be moved from place to place.

The invention having been set forth, what is claimed as new and useful is:—

1. In a fly trap, an inner trap casing V-shaped in cross section, the trap casing having end pieces having their side edges stepped, sheets of mesh work bent upon themselves and spaced apart at the points where they are bent to form an opening and secured to the end pieces above the stepped portion, the inner portions of said mesh work being extended below the outer portion, while the outer portions thereof are bent slightly outward, areas of mesh work secured to the edges of the end pieces below the stepped portions and bent slightly over the stepped portions, the last mentioned areas of mesh work having their upper edges spaced apart between the inner and outer portions of the first mesh work and means for securing the sheets of mesh work to the end pieces.

2. In combination, an outer casing comprising a top and bottom and having mesh work sides between them, an inner casing open at the bottom supported from the bottom of the outer casing and extending inwardly thereof, the inner casing being V-shaped in cross section and having end pieces having their side edges stepped, sheets of mesh work bent upon themselves and spaced apart at the points where they are bent to form an opening and secured to the end pieces above the stepped portion, the inner portions of said mesh work being extended below the outer portion, while the outer portions thereof are bent slightly outward areas of mesh work secured to the edges of the end pieces below the stepped portions and bent slightly over the stepped portions, the last mentioned areas of mesh work having their upper edges spaced apart between the inner and outer portions of the first mesh work and means for securing the sheets of mesh work to the end pieces, the end pieces having grooves, the inner portions of the first mesh work being extended below the upper edges of the first mesh work and secured in the groove at their ends.

In testimony whereof I have signed my name to this specification in the presence of subscribing witnesses.

WILLIAM J. HAMILTON.

Witnesses:
ROBERT O. REDDISH,
GEO. A. HILLS,
F. E. REDDISH.